(12) United States Patent
Sun et al.

(10) Patent No.: US 10,558,834 B2
(45) Date of Patent: Feb. 11, 2020

(54) DISPLAY APPARATUS

(71) Applicants: BOE TECHNOLOGY GROUP CO., LTD., Beijing (CN); Chengdu BOE Optoelectronics Technology, Co., Ltd., Chengdu, Sichuan Province (CN)

(72) Inventors: Kuo Sun, Beijing (CN); Fei Liu, Beijing (CN); Haijun Yin, Beijing (CN); Jianqiang Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 199 days.

(21) Appl. No.: 15/791,057

(22) Filed: Oct. 23, 2017

(65) Prior Publication Data

US 2018/0276444 A1    Sep. 27, 2018

(30) Foreign Application Priority Data

Mar. 24, 2017  (CN) .......................... 2017 1 0182796

(51) Int. Cl.
*G06K 9/00* (2006.01)
*G02F 1/1335* (2006.01)

(52) U.S. Cl.
CPC ... *G06K 9/00013* (2013.01); *G02F 1/133512* (2013.01); *G06K 2009/0006* (2013.01)

(58) Field of Classification Search
CPC ............. G06K 9/00013; G06K 9/0004; G06K 2009/0006; G06K 9/00; G06K 19/0718;
(Continued)

(56) References Cited

U.S. PATENT DOCUMENTS

2009/0207331 A1* 8/2009 Chang ............... G02F 1/136209
349/43
2011/0221022 A1* 9/2011 Toda ..................... G02B 5/188
257/432

(Continued)

FOREIGN PATENT DOCUMENTS

CN    103942537 A    7/2014
CN    105336751 A    2/2016
(Continued)

OTHER PUBLICATIONS

International Search Report and English Translation of Box V of the Written Opinion dated Jan. 11, 2018, received for corresponding Chinese Application No. PCT/CN2017/105495.

*Primary Examiner* — Bobbak Safaipour
(74) *Attorney, Agent, or Firm* — Kinney & Lange, P.A.

(57) ABSTRACT

The disclosure provides a display apparatus including a display panel including a display substrate having a display area divided into pixel regions and spacing regions each located between every two adjacent pixel regions, the display substrate further includes a light shielding layer formed therein with a light through hole within the spacing region; the display apparatus further includes a condensing lens provided at a side of the light shielding layer facing a light exit side of the display panel at a position corresponding to the light through hole, and a fingerprint identification component provided at a side of the light shielding layer facing away from the light exit side, for capturing light coming from the display panel, reflected by a fingerprint of a finger at the light exit side and passing through the light through hole after being condensed by the condensing lens, to identify an image of the fingerprint.

20 Claims, 1 Drawing Sheet

(58) Field of Classification Search
CPC ........ G06K 19/07354; G02F 1/133512; G06F 21/32; G06F 17/3074; G06F 17/30784
See application file for complete search history.

(56) References Cited

U.S. PATENT DOCUMENTS

| | | | |
|---|---|---|---|
| 2012/0086094 A1* | 4/2012 | Watanabe | H01L 27/1464 257/432 |
| 2016/0155856 A1* | 6/2016 | Lin | H01L 29/78606 349/47 |
| 2017/0249494 A1 | 8/2017 | Zhang et al. | |
| 2017/0255810 A1 | 9/2017 | Liu et al. | |
| 2017/0289805 A1* | 10/2017 | Hong | G09G 3/3233 |
| 2018/0276444 A1 | 9/2018 | Sun et al. | |
| 2019/0050621 A1* | 2/2019 | Xu | G06K 9/0004 |
| 2019/0056613 A1* | 2/2019 | Wang | G02F 1/13338 |

FOREIGN PATENT DOCUMENTS

| | | |
|---|---|---|
| CN | 105373772 A | 3/2016 |
| CN | 106022324 A | 10/2016 |
| CN | 106295580 A | 1/2017 |
| CN | 106298859 A | 1/2017 |
| CN | 106847872 A | 6/2017 |
| EP | 3147824 A1 | 3/2017 |
| WO | 2016154378 A1 | 9/2016 |

\* cited by examiner

DISPLAY APPARATUS

CROSS-REFERENCE TO RELATED APPLICATION

This application claims the benefit of the Chinese Patent Application No. 201710182796.0 filed on Mar. 24, 2017 in the State Intellectual Property Office of China, the whole disclosure of which is incorporated herein by reference.

BACKGROUND

Technical Field

Embodiments of the present disclosure generally relate to the field of display technologies, and particularly, to a display apparatus.

Description of the Related Art

In recent years, smart phones have becomes more and more popular and include a payment function which brings great convenience to a phone user, such that payment may be made through the smart phone for shopping, taking a taxi or tour, etc. Thus, there is a need for a safe mobile phone for property protection, so that after the phone is lost, it cannot be unlocked and thereby personal property and information may not be stolen. Fingerprint identification emerges in response to security requirements to the mobile phone. In current mainstream technology, a configuration for enabling fingerprint identification is mainly provided outside of a display area of a screen. For example, some fingerprint identification configurations are provided on a primary key (Home key) of a mobile phone and are unlocked through sliding or pressing operation; some other fingerprint identification configurations are provided on the back of a mobile phone, such that fingerprint identification of a finger which places behind the mobile phone may be made when a hand holds the mobile phone. At present, there is still no product where a fingerprint identification configuration is provided in the display area, resulting in limitation to arrangement of the fingerprint identification configuration.

SUMMARY

The present disclosure is provided to overcome at least one of the above and other problems and defects in the prior arts.

At least an object of the present disclosure is to provide a display apparatus, for enabling fingerprint identification within a display area and obtaining a better identification effect.

An embodiment of the present disclosure provides a display apparatus, comprising a display panel and a fingerprint identification component, the display panel comprising a display substrate having a display area, the display area being divided into a plurality of pixel regions and spacing regions each located between every two adjacent pixel regions, the display substrate further comprises a light shielding layer, a light through hole is formed in the light shielding layer and located within the spacing region, and the display apparatus further comprises a condensing lens provided at a side of the light shielding layer facing towards a light exit side of the display panel and at a position corresponding to the light through hole; and the fingerprint identification component is provided at a side of the light shielding layer facing away from the light exit side of the display panel and configured to capture light, which comes from the display panel, is reflected by a fingerprint of a finger located at the light exit side of the display panel and passes through the light through hole after being condensed by the condensing lens, so as to identify an image of the fingerprint.

In one embodiment, at least some of the pixel regions are each provided with light emitting elements respectively, and the light shielding layer is arranged at a shadow side of the light emitting element.

In one embodiment, an optical axis of the condensing lens passes through a corresponding light through hole.

In one embodiment, the optical axis of the condensing lens coincides with a central axis of the corresponding light through hole.

In one embodiment, the light through hole is located at a focus point position of the corresponding condensing lens.

In one embodiment, a plurality of the light through holes are formed in the light shielding layer and located within the spacing regions, and the display apparatus comprises a plurality of the condensing lenses provided at a side of the display substrate facing away from the light shielding layer, and each light through hole corresponds to at least one condensing lens, such that light condensed or focused by the at least one condensing lens passes through the light through hole to exit towards the fingerprint identification component.

In one embodiment, the light through holes and the condensing lenses are in a one-to-one correspondence, such that the light condensed or focused by each condensing lens passes through a corresponding one of the light through holes to exit towards the fingerprint identification component.

In some embodiments, the display panel further comprises a cover plate arranged opposite to the display substrate, located at a side of the display substrate facing away from the light shielding layer, and supported on the condensing lens.

In some embodiments, the display panel further comprises a cover plate arranged opposite to the display substrate, located at a light exit side of the light emitting element and supported on the condensing lens.

In one embodiment, the plurality of pixel regions are arranged into rows and columns, area of the pixel regions are equal to one another, and the condensing lens is a portion of a sphere.

In one embodiment, the condensing lens has a bottom surface with a radius of 7 μm to 12 μm and has a height of 1 μm to 3 μm.

In one embodiment, the plurality of pixel regions are arranged into columns, each pixel region in one of any two adjacent columns has an area larger than an area of each pixel region in the other of the two adjacent columns, and the condensing lens located between two adjacent columns of pixel regions is a portion of an ellipsoid.

In one embodiment, in case that the condensing lens is a portion of an ellipsoid, a bottom surface of the condensing lens has a macro axis of 12 μm to 20 μm and a minor axis of 6 μm to 12 μm, and the condensing lens has a height of 1 μm to 3 μm.

In one embodiment, the condensing lens has a refractive index of 1.3 to 1.8.

In one embodiment, the light through hole has a hole diameter of 2 μm to 3 μm.

In one embodiment, the light shielding layer is made of a metal material or a non-transparent polyester material.

In one embodiment, the display apparatus is an AMOLED display apparatus.

BRIEF DESCRIPTION OF THE DRAWINGS

The drawings are used to provide further understanding of the present disclosure and constitute a part of the description for illustrating the present disclosure together with the following exemplary embodiments, but are not intended to limit the present disclosure. In the drawings.

DETAILED DESCRIPTION OF PREFERRED EMBODIMENTS

Exemplary embodiments of the present disclosure will be described hereinafter in detail with reference to the drawings. In the description, same or similar elements are indicated by same or similar reference numbers.

In addition, in the description as below, much specific detail is described to provide comprehensive understanding of the embodiments of the present disclosure for ease of presentation. However, it is obvious one or more embodiments may be implemented without the detail. In other situations, known structure and device are shown by means of diagrammatic presentation to simplify the accomplish drawings.

According to a general inventive concept of the present disclosure, there is provided a display apparatus comprising a display panel and a fingerprint identification component, the display panel comprises a display substrate having a display area, the display area is divided into a plurality of pixel regions and spacing regions each located between every two adjacent pixel regions, the display substrate further comprises a light shielding layer, a light through hole is formed in the light shielding layer and located within the spacing region, and the display apparatus further comprises a condensing lens provided at a side of the light shielding layer facing towards a light exit side of the display panel and at a position corresponding to the light through hole; and the fingerprint identification component is provided at a side of the light shielding layer facing away from the light exit side of the display panel and configured to capture light, which comes from the display panel, is reflected by a fingerprint of a finger located at the light exit side of the display panel, and passes through the light through hole after being condensed by the condensing lens, so as to identify an image of the fingerprint, thereby enabling fingerprint identification within the display area.

The following description of the exemplary embodiments of the present disclosure made with reference to the drawings is intended to set forth the general concept of the present disclosure and should not be interpreted as being limitative to the present disclosure.

Figure 1:
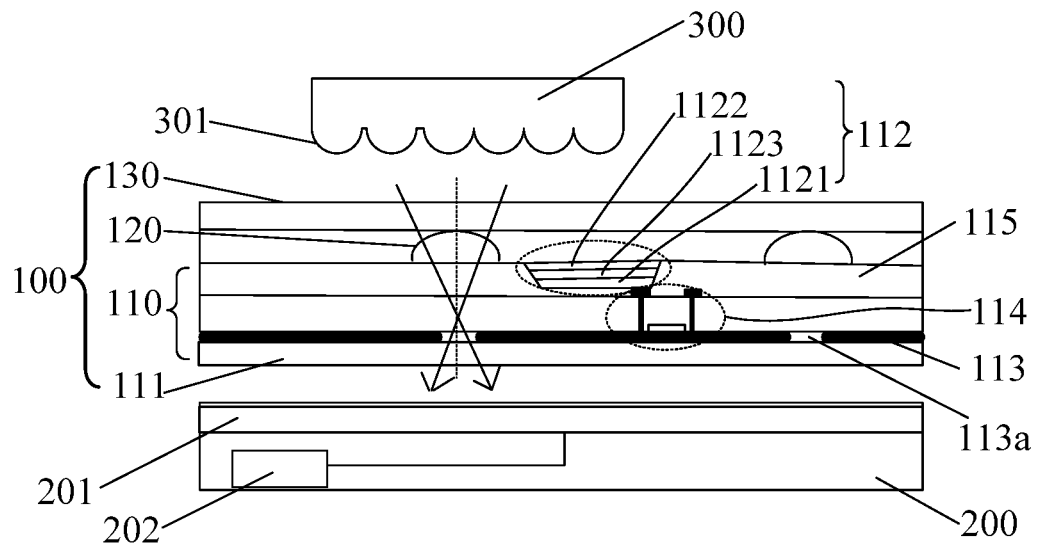
FIG. 1 is a schematic diagram of a structure of a display apparatus according to an exemplary embodiment of the present disclosure, showing corresponding fingerprint identification.
Figure 2:
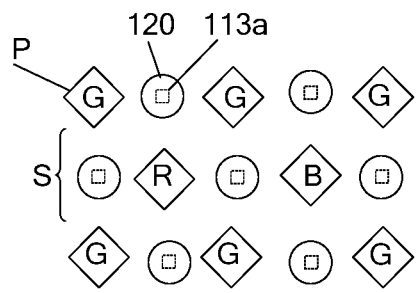
FIG. 2 is a schematic diagram showing a relationship between a shape of a condensing lens and an arrangement of pixel regions in a display apparatus according to an exemplary embodiment of the present disclosure.
Figure 3:
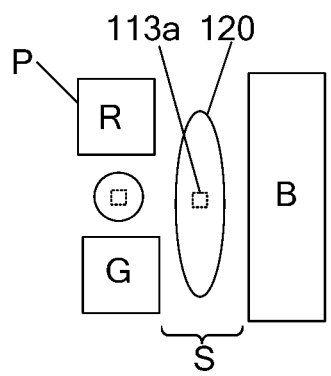
FIG. 3 is a schematic diagram showing a relationship between a shape of a condensing lens and an arrangement of pixel regions in a display apparatus according to another exemplary embodiment of the present disclosure.

An exemplary embodiment of the present disclosure provides a display apparatus for enabling fingerprint identification. FIG. 1 schematically illustrates fingerprint identification made on the display apparatus; and FIG. 2 and FIG. 3 are schematic diagrams respectively showing two exemplary relationships between a shape of a condensing lens and an arrangement of pixel regions in a display apparatus. Referring to FIG. 1 to FIG. 3, the display apparatus comprises a display panel 100 and a fingerprint identification component 200, the display panel 100 comprises a display substrate 110 having a display area, the display area is divided into a plurality of pixel regions P and spacing regions S each located between every two adjacent pixel regions P. In some example, at least some pixel regions (for example, each pixel region) P may be provided with light emitting elements 112. The display panel 100 further comprises a light shielding layer 113, which may be for example provided at a shadow side of a plurality of light emitting elements 112, a plurality of light through holes 113a are formed in the light shielding layer 113 and located within the spacing regions S, and a condensing lens 120 is further provided at a side of the light shielding layer 113 facing towards the light emitting element 112 and at a position corresponding to the light through hole 113a, and as described below, the condensing lens will condense or focus light reflected by a finger fingerprint of a user such that the condensed or focused light passes through a corresponding light through hole in the light shielding layer to exit towards the fingerprint identification component. The fingerprint identification component 200 is provided at a side of the light shielding layer 113 facing away from the light emitting element 112 and configured to capture light, which comes from the display panel 100, is reflected by a fingerprint 301 located at a light exit side of the display panel 100, and passes through the light through hole, so as to identify an image of the fingerprint 301.

Exemplarily, the display substrate 110 may further comprise a base substrate 111 and an array of thin film transistors 114 provided on the base substrate 111. The light emitting element 112 may be provided at a side of the thin film transistor 114 facing away from the base substrate 111. For example, the light emitting element may be an organic light-emitting diode (OLED) which comprises a first electrode 1121 and a second electrode 1122 arranged opposite to each other and a light emitting functional layer 1123 provided between the first electrode and the second electrode, and the first electrode is connected with a drain electrode of the thin film transistor 114. In one example, the light emitting element 112 may be of a bottom light emitting type configuration, the first electrode is disposed between the light emitting functional layer and the base substrate and is a transparent electrode, and the second electrode is a non-transparent electrode; in another example, the light emitting element is of a top light emitting type configuration, the first electrode is a non-transparent electrode, and the second electrode is a transparent electrode.

It is noted that the light emitting element 112 has a light exit side, which is a side of the light emitting element 112 to which light is incident, and a shadow side, which is a side opposite to the light exit side. The light exit side of the light emitting element is the light exit side of the display panel. For a bottom light emitting type light emitting element, its shadow side is a side of the light emitting element 112 facing away from the base substrate 111; for a top light emitting type the light emitting element 112, its shadow side is a side of the light emitting element 112 facing towards the base substrate 111. In one embodiment of the present disclosure, the light emitting element 112 may be a top light emitting type light emitting element, the light shielding layer 113 is located at a side of the light emitting element 112 facing towards the base substrate 111, and the condensing lens 120 is arranged at a side of the display substrate 110 facing away from the light shielding layer 113, for example at a side of the corresponding light through hole 113a facing away from the base substrate 111. In some embodiments, each light through hole corresponds in position to at least one condensing lens, such that the light condensed or focused by the at least one condensing lens passes through the light through hole to exit towards the fingerprint identification component; in other embodiments, the light through holes and the condensing lenses are in a one-to-one correspondence, that is, each light through hole corresponds in position to one condensing lens, such that the light condensed or focused by each condensing lens passes through one corresponding light through hole to exit towards the fingerprint identification component.

With the display apparatus provided according to embodiments of the present disclosure, in a display state, when a finger 300 of a user is placed on the display area of the display panel 100, light emitted from the light emitting element 112 is reflected by the fingerprint 301 of the finger 300, the reflected light passes through the light through hole 113a after being condensed or focused by the condensing lens 120 to exit towards the fingerprint identification component 200, and the fingerprint identification component 200 captures light exiting from each light through hole 113a so as to identify an image of the fingerprint. Arrangement of the light through hole 113a may prevent stray light outside the display apparatus from entering the fingerprint identification component 200 and thus affecting the fingerprint identification effect, and arrangement of the condensing lens 120 enables the light reflected by the fingerprint 301 to be more highly concentrated, obtaining a better identification effect. Thus, the present disclosure can achieve fingerprint identification within the display area and obtain a better fingerprint identification effect, and a normal display will not be adversely affected because the light shielding layer 113 is provided at the shadow side of the light emitting element 112 and the light through holes 113a are provided in the spacing regions between the pixel regions.

In some embodiments, in order that the fingerprint identification component 200 can identify a complete fingerprint image, the light through hole 113a and the condensing lens 120 are arranged such that when the finger 300 is placed on the display area of the display panel 100, most (preferably, all) of light reflected by the fingerprint of the finger 300 may pass through the corresponding condensing lens 120 and light through hole 113a to reach the fingerprint identification component 200. In an exemplary embodiment, the fingerprint identification component 200 may comprise a photoelectric sensor 201 and an image processor 202, the photoelectric sensor 201 is configured for converting received light into an electrical signal and sending the electrical signal to the image processor 202, and the image processor 202 is configured to acquired images of the fingerprint at positions corresponding to respective condensing lenses according to the received electrical signal and further synthesize the images into a complete fingerprint image.

In one embodiment, an optical axis of the condensing lens 120 passes through a corresponding light through hole 113a. Exemplarily, the optical axis of the condensing lens 120 coincides with a central axis of the corresponding light through hole 113a. In one example, the light through hole 113a may be located at a focus point position of the corresponding condensing lens 120, such that the light which is condensed by the condensing lens 120 may pass through the light through hole 113a as much as possible, so as to improve the fingerprint identification effect.

In some examples, in order to ensure the light condensed by the condensing lens 120 may sufficiently pass through the light through hole while preventing external stray light from passing through the light through hole 113a 200 and affecting the fingerprint identification effect, the light through hole 113a may have a hole diameter of 2 μm to 3 μm. For example, the light through hole 113a may be circular light through hole, or may be a square light through hole or other shaped light through hole. When the light through hole 113a is a square light through hole, the hole diameter of the light through hole 113a is the maximum transversal dimension of the light through hole 113a.

In one embodiment, the display panel 100 further comprises a cover plate 130 arranged opposite to the display substrate 110, and the cover plate 130 is located at the light exit side of the light emitting element and supported on the condensing lens 120. In some embodiments, the light emitting element 112 is a top light emitting type light emitting element, and the cover plate 130 is located at the light exit side of the light emitting element 112, that is, the cover plate 130 is located at the side of the light emitting element 112 facing away from the base substrate 111. Meanwhile, the condensing lens 120 may function to condense light and support the cover plate 130 so as to maintain structural stability of the display panel 100, thereby enabling a simple configuration to implement fingerprint identification within the display area and to maintain stability of the display panel 100.

In some embodiments, the display substrate 110 further comprises a pixel definition layer 115 provided above the array of thin film transistors 114, a plurality of recesses are formed in the pixel definition layer 115, the light emitting element 112 are provided within the recesses, and the condensing lens 120 may be provided on the pixel definition layer 115. In some examples, the condensing lens 120 has a refractive index of 1.3 to 1.8. For example, the refractive index of the condensing lens 120 is 1.7.

In embodiments of the present disclosure, the pixel regions P may have various arrangements. Shown in FIG. 2 is a first arrangement where the plurality of pixel regions P are arranged into rows and columns and have areas equal to one another, and in this case, the condensing lens 120 may be a portion of a sphere or a partial sphere. For example, the condensing lens 120 has a bottom face with a radius of 7 μm to 12 μm and has a height of 1 μm to 3 μm.

In this case where pixel regions P are uniformly arranged, the condensing lenses 120 are uniformly arranged correspondingly, and when the finger 300 touches the display panel, each of the condensing lenses 120 located at positions corresponding to the touch region captures light reflected by one region (for example, a circular region) of the finger 300, thereby it is more advantageous for the fingerprint identification component 200 to obtain the complete fingerprint image according to light reflected back by respective regions.

Shown in FIG. 3 is a second arrangement where the plurality of pixel regions P are arranged into columns, the pixel region P in one of any two adjacent columns has an area larger than an area of the pixel region P in the other column, and the condensing lens 120 located between two adjacent columns of pixel regions P is a portion of an ellipsoid or a partial ellipsoid. As shown in FIG. 3, a blue pixel region B in the right column has an area which is about a sum of areas of a red pixel region R and a green pixel region G in the left column, the condensing lens located between the left column of pixel regions P and the right column of pixel region P has an elliptical bottom face, thereby making the most of the spacing region S. For a same column of pixel regions P, areas of respective pixel regions P may be the same, and the condensing lens 120 between two adjacent pixel regions P may be a portion of a sphere or a partial sphere.

Exemplarily, when the condensing lens 120 is a portion of an ellipsoid, the elliptical bottom face of the condensing lens 120 has a macro axis of 12 μm to 20 μm and a minor axis of 6 μm to 12 μm, and the condensing lens has a height of 1 μm to 3 μm.

A material of the light shielding layer 13 is not particularly limited in embodiments of the present disclosure, for example, the light shielding layer may be made of metal material or other non-transparent material such as non-transparent polyester material.

In some embodiments, the above display apparatus may be an AMOLED display apparatus. In other embodiments, the display panel of the display apparatus is provided with no light emitting element, and instead, an external backlight source is provided to supply light to the display panel.

In the display state of the display apparatus according to embodiments of the present disclosure, when a finger of a user is placed on the display area of the display panel, light emitted from the light emitting element is reflected by a fingerprint of the finger, the reflected light is condensed by the condensing lens and then passes through the light through hole to reach the fingerprint identification component, and the fingerprint identification component identifies an image of the fingerprint according to light exiting from the light through hole. Arrangement of the light through hole may prevent stray light outside the display apparatus from entering the fingerprint identification component and thus affecting the fingerprint identification effect, and arrangement of the condensing lens enables the light reflected by the fingerprint to be more highly concentrated, obtaining a better identification effect. Thus, the present disclosure can achieve fingerprint identification within the display area and obtain a better fingerprint identification effect, and a normal display will not be adversely affected because the light shielding layer is provided at the shadow side of the light emitting element and the light through holes are provided in the spacing regions between the pixel regions.

It should be appreciated that the above embodiments are only exemplary embodiments for illuminating inventive concepts of the present disclosure, and the present disclosure is not limited to those. Various changes or modifications may be made by those skilled in the art without departing from the principle and spirit of the present disclosure and shall fall within the scope of the present disclosure.

What is claimed is:

1. A display apparatus, comprising a display panel and a fingerprint identification component, the display panel comprising a display substrate having a display area, the display area being divided into a plurality of pixel regions and spacing regions each located between every two adjacent pixel regions, wherein:
    the display substrate further comprises a light shielding layer, a light through hole is formed in the light shielding layer and located within the spacing region, and the display apparatus further comprises a condensing lens provided at a side of the light shielding layer facing towards a light exit side of the display panel and at a position corresponding to the light through hole; and
    the fingerprint identification component is provided at a second side of the light shielding layer facing away from the light exit side of the display panel and configured to capture light, which comes from the display panel, is reflected by a fingerprint of a finger located at the light exit side of the display panel and passes through the light through hole after being condensed by the condensing lens, so as to identify an image of the fingerprint.

2. The display apparatus according to claim 1, wherein at least some of the pixel regions are each provided with a light emitting element respectively, and the light shielding layer is arranged at a shadow side of the light emitting element.

3. The display apparatus according to claim 2, wherein the display panel further comprises a cover plate arranged opposite to the display substrate, located at a light exit side of the light emitting element and supported on the condensing lens.

4. The display apparatus according to claim 1, wherein an optical axis of the condensing lens passes through a corresponding light through hole.

5. The display apparatus according to claim 4, wherein the display panel further comprises a cover plate arranged opposite to the display substrate, located at a side of the display substrate facing away from the light shielding layer, and supported on the condensing lens.

6. The display apparatus according to claim 4, wherein the optical axis of the condensing lens coincides with a central axis of the corresponding light through hole.

7. The display apparatus according to claim 6, wherein the corresponding light through hole is located at a focus point position of the condensing lens.

8. The display apparatus according to claim 7, wherein the display panel further comprises a cover plate arranged opposite to the display substrate, located at a side of the display substrate facing away from the light shielding layer, and supported on the condensing lens.

9. The display apparatus according to claim 6, wherein the display panel further comprises a cover plate arranged opposite to the display substrate, located at a side of the display substrate facing away from the light shielding layer, and supported on the condensing lens.

10. The display apparatus according to claim 1, wherein a plurality of the light through holes are formed in the light shielding layer and located within the spacing regions, and the display apparatus comprises a plurality of condensing lenses provided at a side of the display substrate facing away from the light shielding layer, and
    each of the plurality of light through holes corresponds to at least one of the condensing lenses, such that light condensed or focused by the at least one of the condensing lenses passes through the light through hole to exit towards the fingerprint identification component.

11. The display apparatus according to claim 10, wherein the light through holes and the condensing lenses are in a one-to-one correspondence, such that the light condensed or focused by each of the condensing lenses passes through a corresponding one of the light through holes to exit towards the fingerprint identification component.

12. The display apparatus according to claim 1, wherein the display panel further comprises a cover plate arranged opposite to the display substrate, located at a side of the display substrate facing away from the light shielding layer, and supported on the condensing lens.

13. The display apparatus according to claim 1, wherein the plurality of pixel regions are arranged into rows and columns, areas of the pixel regions are equal to one another, and the condensing lens is a portion of a sphere.

14. The display apparatus according to claim 13, wherein the condensing lens has a bottom surface with a radius of 7 μm to 12 μm and has a height of 1 μm to 3 μm.

15. The display apparatus according to claim 1, wherein the condensing lens has a refractive index of 1.3 to 1.8.

16. The display apparatus according to claim 1, wherein the light through hole has a hole diameter of 2 μm to 3 μm.

17. The display apparatus according to claim 1, wherein the light shielding layer is made of a metal material or a non-transparent polyester material.

18. The display apparatus according to claim 1, wherein the display apparatus is an AMOLED display apparatus.

19. A display apparatus, comprising a display panel and a fingerprint identification component, the display panel comprising a display substrate having a display area, the display area being divided into a plurality of pixel regions and spacing regions each located between every two adjacent pixel regions, wherein:

the display substrate further comprises a light shielding layer, a light through hole is formed in the light shielding layer and located within the spacing region, and the display apparatus further comprises a condensing lens provided at a side of the light shielding layer facing towards a light exit side of the display panel and at a position corresponding to the light through hole; and the fingerprint identification component is provided at a second side of the light shielding layer facing away from the light exit side of the display panel and configured to capture light, which comes from the display panel, is reflected by a fingerprint of a finger located at the light exit side of the display panel and passes through the light through hole after being condensed by the condensing lens, so as to identify an image of the fingerprint, and wherein the plurality of pixel regions are arranged into columns, each pixel region in a first one of any two adjacent columns has an area larger than an area of each pixel region in a second one of the two adjacent columns, and the condensing lens located between two adjacent columns of pixel regions is a portion of an ellipsoid.

20. The display apparatus according to claim 19, wherein a bottom surface of the condensing lens has a macro axis of 12 μm to 20 μm and a minor axis of 6 μm to 12 μm, and the condensing lens has a height of 1 μm to 3 μm.

* * * * *